A. T. MILLS.
AUTOMATIC LOCKING SPRING WASHER.
APPLICATION FILED FEB. 17, 1920.
1,353,776. Patented Sept. 21, 1920.
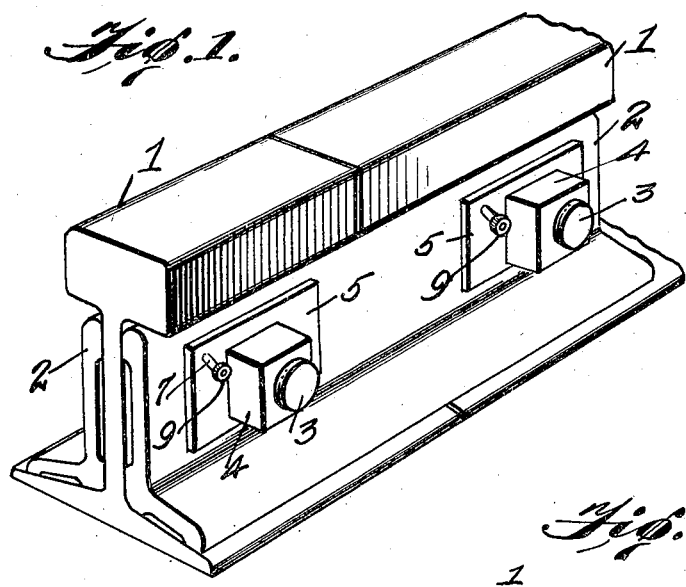
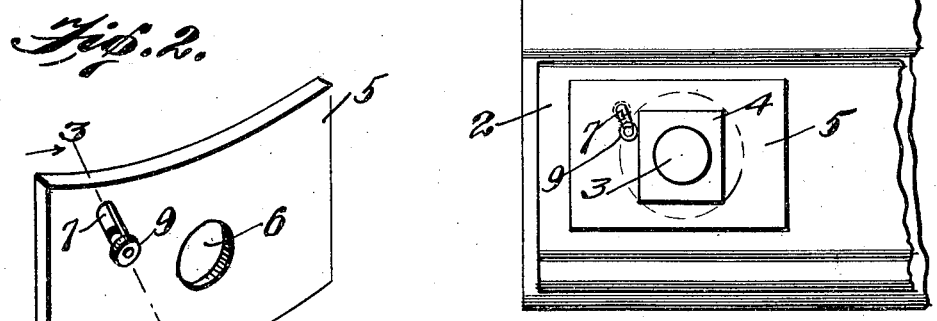
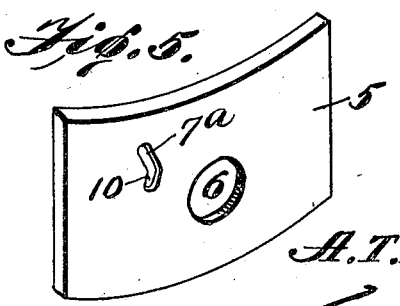

UNITED STATES PATENT OFFICE.

ASBERY T. MILLS, OF RICHLAND, IOWA.

AUTOMATIC-LOCKING SPRING-WASHER.

1,353,776.  Specification of Letters Patent.  Patented Sept. 21, 1920.

Application filed February 17, 1920. Serial No. 359,384.

*To all whom it may concern:*

Be it known that I, ASBERY T. MILLS, a citizen of the United States, residing at Richland, in the county of Keokuk and State of Iowa, have invented certain new and useful Improvements in Automatic-Locking Spring-Washers, of which the following is a specification, reference being had therein to the accompanying drawings.

This invention relates to a nut lock, or more particularly to an automatic-locking spring-washer.

The object of the invention is the construction of a simple and positive device which can be quickly adjusted by the operator, when it is desired to release or remove a nut off a bolt, or which, upon the operator releasing the same, will quickly move to a position for positively preventing a nut from being accidentally displaced or removed from a bolt.

With this and other objects in view, my invention comprises certain other novel combinations, constructions and arrangements of parts, as will be hereinafter fully described, illustrated in the accompanying drawings, and more particularly pointed out in the appended claims.

In the drawings:

Figure 1 is a perspective view of a device constructed in accordance with the present invention, while Fig. 2 is an enlarged view of the device removed from the bolt and nut, as shown in Fig. 1.

Fig. 3 is a sectional view taken on line 3—3, Fig. 2, and looking in the direction of the arrows.

Fig. 4 is a view in front elevation of the device, showing the same assembled with a bolt and a nut.

Fig. 5 is a perspective view of another embodiment of the spring-washer.

Referring to the drawings by numerals, 1 designates rails against the web of which are placed the fish plates 2. Bolts 3 extend through the rails and the fish plates and on these bolts are nuts 4.

On the bolts 3 and behind the nuts 4, in engagement with one of the fish plates, are outwardly-bowed or bent spring washers 5. Each washer 5 is provided with a central aperture 6, through which bolt 3 extends, and contiguous to the aperture 6 is an inclined elongated aperture 7. Mounted in the elongated inclined aperture 7 is a rivet 8 on which is mounted a roller 9. In the embodiment shown in Fig. 5, the washer 5 is provided with an angle elongated aperture $7^a$ so that when the rivet 8 has moved to the lower portion 10 of the aperture $7^a$, and the roller 9 is pressing against a nut 4, this angle structure of the elongated aperture $7^a$ will further assist in holding the rivet and roller from accidentally moving up the elongated aperture, or in other words, moving away from the nut, although from actual experience I have found that the structure of the elongated aperture 7, Fig. 2, produces a very efficient result.

When it is desired to fasten nuts 4 upon the bolts, the screwing of the nuts tightly upon the bolts will cause the washers to bear flat against a fish plate, which, in itself, has a tendency to prevent free rotary movement of the nuts upon the bolts, and then, after this tightening, the rivet and roller will be in the lowest end of the elongated aperture, as shown in Figs. 1 to 4, thereby the roller will bear against the upper portion of one side of the nut and prevent it from being unscrewed, until the roller has been moved from this engaging position.

It is to be understood that the rivet 8 is provided with headed ends to retain the same mounted in the aperture, and also to retain the roller thereon; it is immaterial whether the roller 9 rotates independent of the rivet or whether the roller is fixed to the rivet and both the roller and rivet rotate synchronously. The inner head of the rivet is fitted into a groove $7^a$, causing the head to be counter-sunk at the back of the washer, so that the rivet is free to move, when necessary, upon the washer, even though it is tightly pressed against the fish plate, as shown in Fig. 1.

While I have described the preferred embodiment of my invention and have illustrated the same in the accompanying drawings, in the extensive manufacture of my device, certain minor changes or alterations may be found desirable, and, I, therefore, reserve the right to make such alterations or changes as shall fairly fall within the scope of the appended claims.

What I claim is:

1. A washer device of the class described, comprising an outwardly-bowed body having a central bolt-receiving aperture, said body provided with an elongated aperture contiguous to said bolt-receiving aperture, a rivet bodily movable in said elongated aperture its entire length, and a roller on said rivet and engaging one side of the body.

2. A washer device of the class described, comprising an outwardly-bowed resilient body having a central bolt-receiving aperture, said body provided with an elongated aperture contiguous to said bolt-receiving aperture, a rivet slidably mounted in said elongated aperture and provided with heads at its ends, the head at the inner end of the rivet seated in a portion of the elongated aperture, and a roller mounted upon the rivet between its heads, substantially as shown and described.

In testimony whereof I hereunto affix my signature.

ASBERY T. MILLS.